(12) United States Patent
Biselx

(10) Patent No.: US 8,096,061 B2
(45) Date of Patent: Jan. 17, 2012

(54) INSTRUMENT FOR MEASURING DIMENSIONS AND HEIGHT GAUGE

(75) Inventor: Frédéric Biselx, Yens (CH)

(73) Assignee: TESA SA, Renens (CH)

( * ) Notice: Subject to any disclaimer, the term of this patent is extended or adjusted under 35 U.S.C. 154(b) by 0 days.

(21) Appl. No.: 12/778,267

(22) Filed: May 12, 2010

(65) Prior Publication Data

US 2010/0287786 A1    Nov. 18, 2010

(30) Foreign Application Priority Data

May 13, 2009    (EP) .................................... 09160174

(51) Int. Cl.
    *G01B 5/02*    (2006.01)
    *G01B 7/02*    (2006.01)

(52) U.S. Cl. ......................................................... 33/832

(58) Field of Classification Search .................... 33/832, 33/833
    See application file for complete search history.

(56) References Cited

U.S. PATENT DOCUMENTS

| 4,766,674 | A |   | 8/1988  | Zanier et al. |           |
|-----------|---|---|---------|---------------|-----------|
| 4,845,855 | A |   | 7/1989  | Meyer         |           |
| 4,916,825 | A | * | 4/1990  | Breyer        | ... 33/561 |
| 4,924,598 | A |   | 5/1990  | Gruhler       |           |
| 5,040,308 | A | * | 8/1991  | Meyer         | ... 33/832 |
| 5,373,645 | A |   | 12/1994 | Bezinge et al.|           |
| 5,471,406 | A | * | 11/1995 | Breyer et al. | ... 702/168 |
| 5,937,533 | A | * | 8/1999  | Meyer et al.  | ... 33/832 |
| 6,401,352 | B1 | * | 6/2002 | Kimura et al. | ... 33/832 |
| 6,813,845 | B2 | * | 11/2004 | Jordil et al. | ... 33/833 |
| 6,952,883 | B2 | * | 10/2005 | Jordil et al. | ... 33/504 |
| 7,434,331 | B2 | * | 10/2008 | Zanier        | ... 33/832 |
| 2004/0221465 | A1 |  | 11/2004 | Smith et al. |           |
| 2007/0245586 | A1 |  | 10/2007 | Zanier       |           |

FOREIGN PATENT DOCUMENTS

| CH | 667726 A5  | 10/1988 |
| DE | 3719509 A1 | 12/1988 |
| EP | 0223736 A1 | 5/1987  |
| EP | 0579961 A  | 1/1994  |
| EP | 1847798 A  | 10/2007 |

OTHER PUBLICATIONS

European Search Report for EP09160174 dated Sep. 2, 2009.

* cited by examiner

*Primary Examiner* — Christopher Fulton
(74) *Attorney, Agent, or Firm* — Pearne & Gordon LLP

(57) ABSTRACT

Instrument for measuring dimensions, including: a mobile carriage capable of moving parallel to a guide, the guide defining a measuring axis; a driving device connected to the carriage by a transmission, so as to determine the linear displacement of the mobile carriage; a feeler attached to the mobile carriage and designed to come into contact with a part to be measured; a position transducer, arranged so as to supply a measurement of the feeler's position relative to the measuring axis; a piezoresistive force sensor for converting directly a contact force between the feeler and the part to be measured into an electric signal.

22 Claims, 3 Drawing Sheets

INSTRUMENT FOR MEASURING DIMENSIONS AND HEIGHT GAUGE

REFERENCE DATA

This application claims priority from European Patent Application EP09160174 filed on May 13, 2009.

TECHNICAL FIELD

The present invention concerns an instrument for measuring dimensions along a linear axis, in particular, but not exclusively, an instrument for measuring linear dimensions along a vertical and a horizontal measuring axis.

STATE OF THE ART

Measuring instruments such as height gauges and machines for measuring coordinates are used for measuring and controlling the dimensions of high precision mechanical parts. They supply measurements with an accuracy and reproducibility on the order of the micrometer.

These instruments allow relative measurements as well as absolute measurements to be performed. They are generally associated to a horizontal plane table or a measuring bench on which the part to be measured or controlled is placed in a chosen position so that this common element constitutes a reference plane between the device and the part to be measured.

Usually, dimension measuring apparatus include three guides oriented in parallel to three rectangular coordinate axes. In the case of a height gauge, two of these axes are ignored as they are inscribed in the plane of the measuring bench and a guide oriented perpendicularly to the measuring bench constitutes a vertical measuring axis. It is also conceivable to execute other configurations allowing measurements according to one of the other axes, considering that the other two axes define the reference plane.

These devices are designed for measuring parts made of rigid materials whose deformation under the effect of a force is considered zero. This limits the field of application of these devices.

On measuring columns, the guide is fastened vertically on a rigid base comprising a soleplate that can be moved by sliding, or on an air cushion, on the measuring bench, so as to be able to access all portions of the lateral sides of the part to be measured.

The measuring instruments also generally have, on each measuring axis, a fixed position reference, a high precision position encoder as well as an electronic control and display device, possibly contained in a console visible to the operator, for displaying the measured dimensions in one or several measuring modes.

European patent EP0579961 in the name of the applicant describes a height gauge with a measuring carriage sliding on a vertical guide. The measuring carriage comprises a "floating" driving carriage sliding relative to the measuring carriage and that transmits the vertical force exerted on the measuring carriage. In this instrument, the connection between the measuring carriage and the driving carriage is elastic: a system of adjusted springs connecting both carriages balances and at the same time guarantees a minimal contact force acting on the measuring carriage to determine the direction of the measurement and ensure a good contact with the part to be measured.

Other measuring columns with a similar force application device are known, for example the documents CH667726 and EP0223736. The devices of these documents comprise an elastic transmission element between the drive motor and the measuring probe and are arranged to perform dimension measurements when the deformation of the elastic element reaches a predetermined value and thus the pressing force of the probe on the part to be measured approaches this predetermined value.

Devices, for example U.S. Pat. No. 4,924,598, are also known wherein the deflection of the elastic element transmitting the measuring force to the sensor probe is not measured continuously, but when a deformation threshold is exceeded it is detected by an electric contact. These simpler devices however do not permit to measure a force overshoot during measurement. Furthermore, this device does not allow the measuring conditions and notably the pressing force of the probe during measurement to be varied or corrected.

In all the known devices based on the measuring of the dimensional deformation of an elastic element, the latter will generally be determined by a displacement sensor such as for example an electric potentiometer giving information on the relative position between two carriages or a touch probe of a fairly easy type. These low-cost sensors however have some flaws, as they do not provide information referenced accurately and do not afford perfect correspondence with the contact force, their calibration is likely to change with time and they need to be protected from dust as well as from water and/or oil projections.

Furthermore, the known floating carriage systems exhibit an additional degree of freedom which can influence the accuracy of the measurement. The journey of the floating carriage is rather considerable and the time required for stabilizing the system does not allow quick measuring operations to be performed.

It is also known that for certain measuring or scanning operations, such as for example the search for minima, an elastic connection between the measuring system and the driving system slows down the measuring. The floating carriage device can also constitute a weak element during fine adjustments of the probe's position, because the system does not provide enough flexibility for measuring when the measured force varies only slightly. The system is then obliged to continually seek points of equilibrium of constant force, which continuously requires periods of stabilization before supplying dimensional information.

In the double-carriage measuring columns, the elastic elements require a specific adjustment for each orientation of the system, i.e. the weight of the measuring carriage is held in equilibrium by this elastic system and thus a change in the system's orientation requires modifications of these elastic elements.

BRIEF SUMMARY OF THE INVENTION

One aim of the present invention is to propose an instrument for measuring dimensions free from the limitations of the known devices. According to the invention, these aims are achieved notably by means of the object of the main claim.

This solution notably has the advantage over the prior art of converting the contact force directly into an electric signal without basing the measurement on an indirect, imprecise measurement made on the relative displacement between two carriages. This allows the actual contact force exerted along the observed axes to be measured and advantageously reduces the number of elements that could cause errors. It is thus possible to obtain a more compact, more rigid structure, a better measuring accuracy, a faster response to the variations of the position and good immunity against projections.

The inventive instrument comprises a force sensor for measuring along the instrument's displacement and measuring axis. Preferably, the sensor is pre-stressed since it must allow force variations in both displacement directions to be measured. This configuration is not limiting, since other sensors can be added to determine the orientation of the contact force along the different orthogonal axes.

Furthermore, the inventive measuring instrument preferably includes one or several additional elastic connections or a device for limiting the driving force by means of a friction element in order to protect the force sensor. One of the first additional elastic elements that is situated at the level of the driving system control enables a limitation of the force exerted by the operator or the motor when the probe comes into contact with the part to be measured. Other elastic elements can be added serially to the force sensor to increase the elastic displacement limits of the measuring system and thus protect the sensor. As the elastic deformation does not influence the measurement of the position, adding these protection devices is not limited. It will also be possible to add stops and/or elements parallel to the force sensor in order not to exceed the admissible deformation limit of the sensor and thus shunt mechanical overloads.

The direct reading of the contact force enables this fundamental measuring parameter to be better controlled. Indeed, the contact force can have a dimensional influence on certain materials. Therefore, a finer measurement of the exerted contact force makes it possible to interpolate from several measurements of different contact forces the elasticity of the measured material and thus also to extrapolate from the actual dimension of the measured part that would be achieved with a zero contact force corresponding to a zero elastic deformation. Furthermore, with a zero contact force, the dimension of the part to be measured is no longer influenced by parasite contact forces in the case where surfaces are measured that would not be orthogonal to the instrument's measuring axis.

Advantageously, the invention affords an improved search of optima that can be performed by following the variation both of force and of position. The measured dimensional value is thus no longer limited only to a predefined contact force. The inventive device can correct the dimension measurement according to variations of the contact force, which is not possible with the prior art instruments. The device also takes into account each material and optimizes the value correction according to the material's elasticity without necessarily requiring a correction of the position's mechanics.

This invention is not limited to a vertical measuring system; it can also serve for absolute or relative measurements along a horizontal axis or can even serve for measuring along any axis in a volume, at the end of an articulated arm for example. Thanks to the great fineness of measurement with respect to the contact force, it is possible to guarantee a dimensional measurement in diverse orientations without any loss of precision. Thanks to its rigid and simple structure, linear measurements are no longer limited only to some orientations of the system and the orientation of the measured surface is no longer limited to surfaces parallel to the reference plane. In the different orientations, the effect of the carriage's weight influences only the sensor's point of operation without requiring any modification of the elastic elements. The choice of the pre-stressing of the force sensor can be made so as to answer different possible orientations without requiring the points of equilibrium to be adapted.

The known measuring columns are generally limited to the measurement of surfaces parallel to the reference plane. When such a device measures surfaces that do not fall into this category or no longer associated to a reference plane, it must be able to distinguish the orientation of the contact force. Without this, the contact force can exceed the force measured by the instrument along its measuring axis. Furthermore, the dimension of the measuring element, like a spherical measuring probe, must take into account the orientation of the surface to correctly take into account the dimension (projection) of the measuring probe relative to the instrument's displacement axis.

In one embodiment of the invention, not represented, the system makes it possible to distinguish the orientation of the contact force, normal to the measured surface, relative to the device's measuring axis. It is thus capable of finding the optimum measuring force that corresponds to a surface orthogonal to the measuring axis.

In another embodiment by means of other force sensors, it is capable of measuring the contact force along each direction in order for the force exerted during the measurement to be adapted to the orientation of the surface.

BRIEF DESCRIPTION OF THE FIGURES

Examples of embodiments of the invention are indicated in the description illustrated by the attached figures, in which.

EXAMPLE(S) OF EMBODIMENTS OF THE INVENTION

Figure 1:
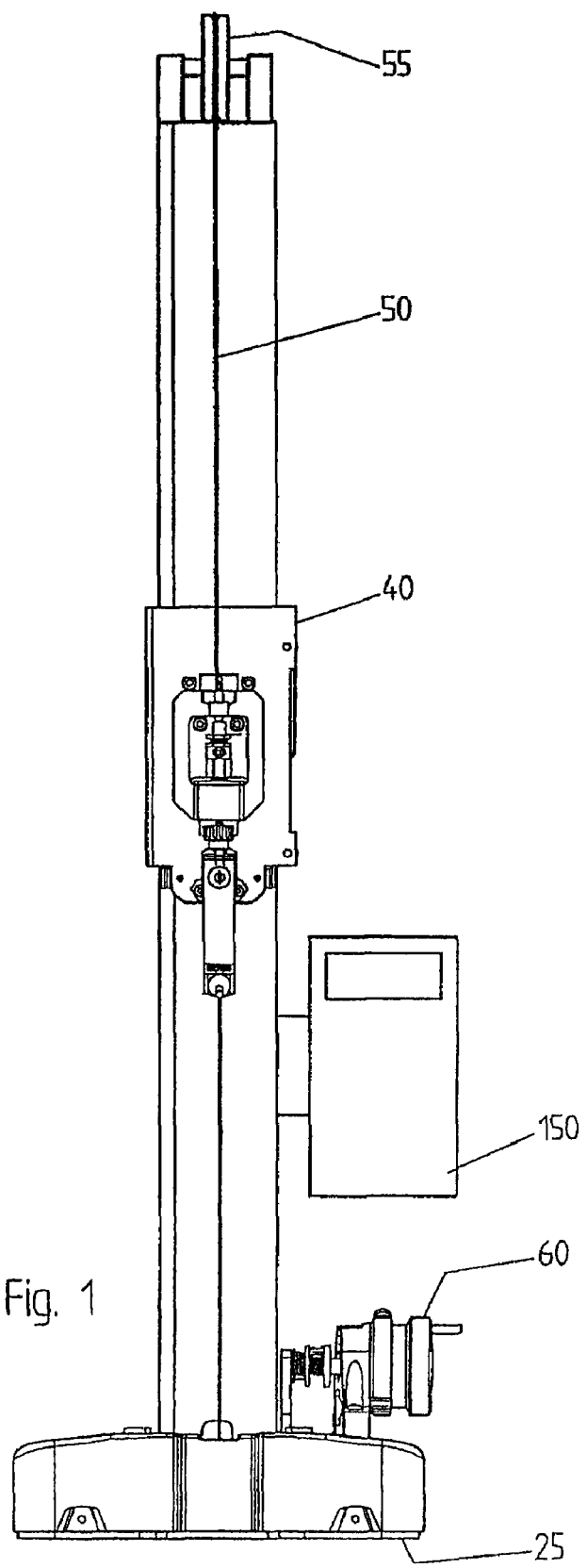
FIG. 1 illustrates an overall view of a measuring column according to an embodiment of the invention.
Figures 2, 3:
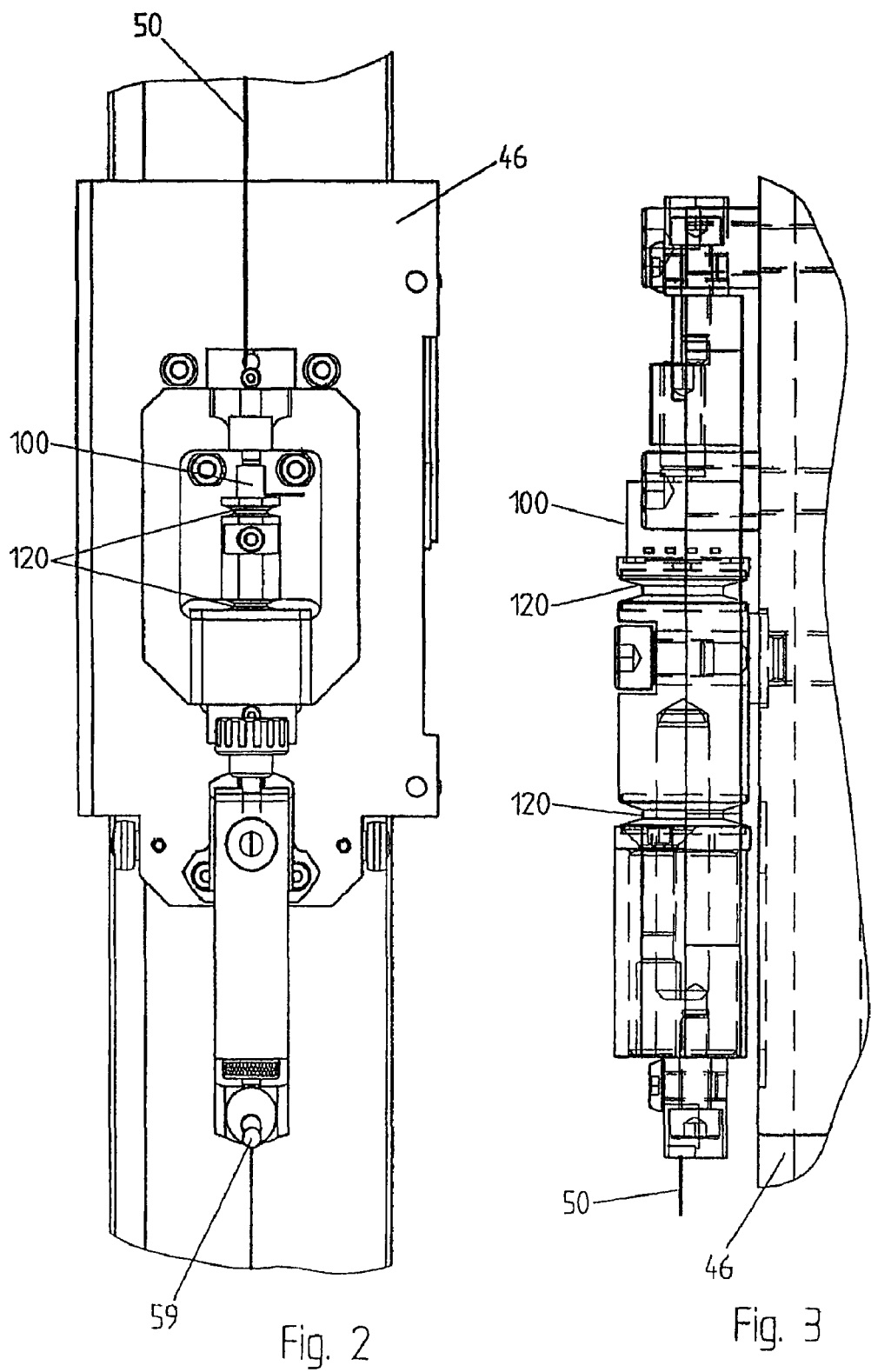
FIGS. 2 and 3 show details of the carriage of the measuring column of FIG. 1.

The height gauge of FIG. 1 comprises a solebase 25 designed to rest against a reference plane and a vertical frame 30 comprising a position reference defining a vertical measuring axis. The carriage 40 slides along the frame 30 and its position is read by a position encoder, not visible in the figure. The position encoder is preferably an optical encoder capable of reading the carriage's position with a precision on the order of, or greater than, the micrometer. Other position measuring systems are however also possible.

Figure 4:
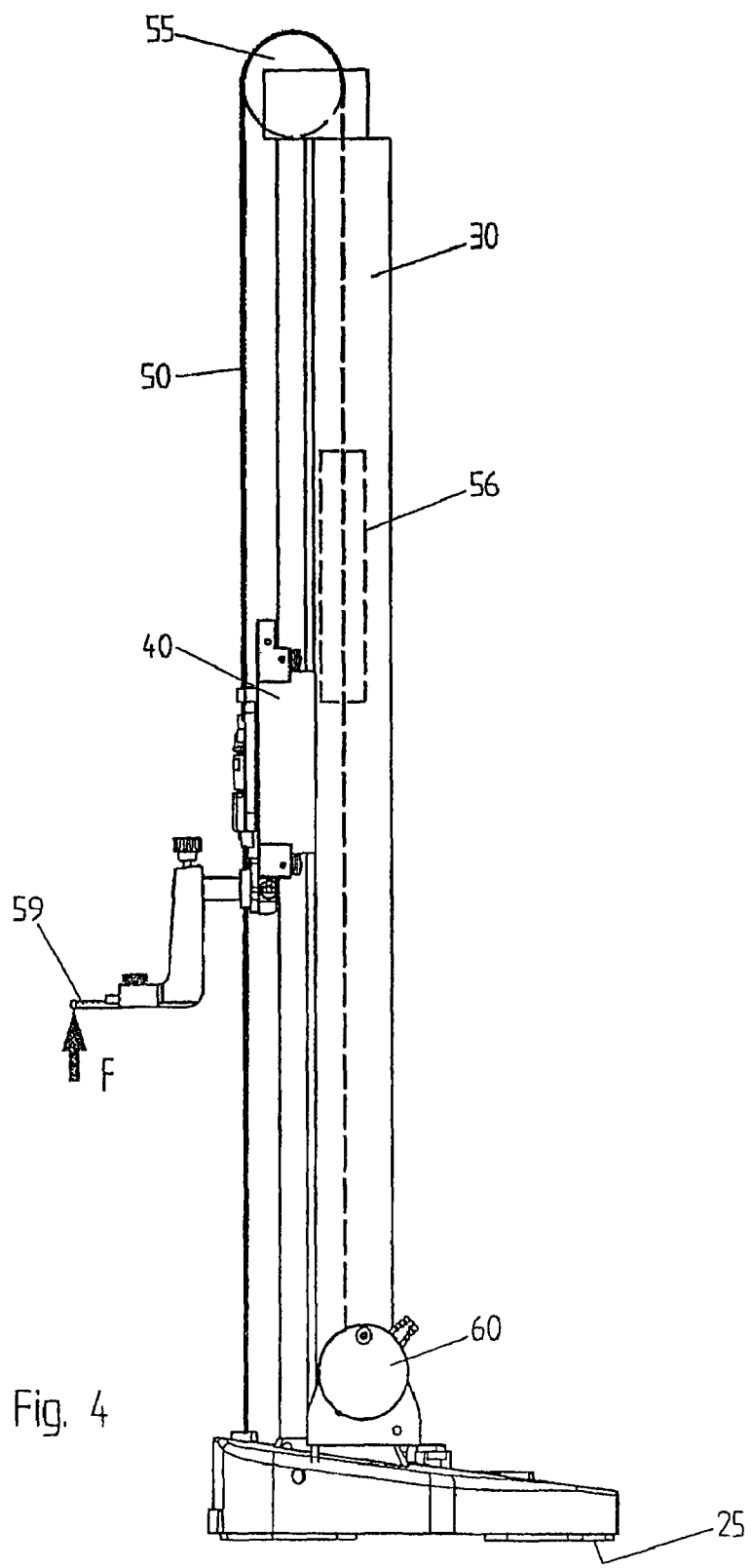
FIG. 4 shows the column of FIG. 1 in a side view.

The movement of the carriage 40 is ensured through the force sensor 100, through the cable 50 forming a closed loop around the upper pulley 55 and a lower pulley, not visible. The lower pulley is driven by the handle 60 that can be actuated by the operator and that allows the carriage 40 to move. A counterweight 56 (visible in FIG. 4) counterbalances the weight of the carriage. The probe 59, preferably interchangeable, is brought into contact with the surfaces to be measured.

According to one embodiment of the invention, not represented, the displacement of the carriage 40 is ensured by an electric motor driving the lower pulley or the upper pulley with partially elastic means. Optionally, the cable could be replaced by a belt or metallic band or any other suitable flexible transmission element.

The force sensor 100 is for example a system of strain gauges, of piezoresistive elements, a charge cell or any other suitable sensor, as well as at least one elastic element 120 interposed on each side between the cable 50 and the carriage 40. The elastic elements 120 determine a pre-stress of the sensor 100. This system allows the contact force to be measured in both directions along the measuring axis. The measuring force applied on the probe 59 is read directly by the sensor. The latter generates an electric signal representative of the contact force and transmits this information to the measuring console 150. The elastic elements also have the function of protecting the force sensor and increase, in a controlled fashion, the system's elastic displacement limits.

The measuring console 150 preferably includes display means for automatically displaying the dimension measured along the measuring axis and the contact force measured by the sensor, as well as command and data input means, for example a keyboard. The measuring console 150 preferably includes an acoustic warning device to signal to the operator that the measured force has reached the desired target value and it memorizes the height measurement corresponding to this desired contact force. More preferably, the measuring console includes computation means, for example a numeric processor, arranged for reading the data coming from the position encoder of the carriage 40 and from the force sensor 100 and for supplying measurement results according to the programs stored in its memory, for example diameters, center, location of inversion points, parallelism, measurement of the elasticity, finding the orientation of the measured surface, etc.

In the illustrated embodiment, the measuring console 150 has a case in which are lodged all its components: display, keyboard, processor etc. However, this is not a limitative characteristic of the invention, which also comprises measuring instruments wherein these components are placed differently, for example in the base or in the frame, or in external devices connected to the measuring instrument, for example a computer.

In the motorized version of the invention, the measuring console also includes a control unit of the drive motor that controls the motor according to programs, for example according to the electric signal for the force from the sensor 100. The control unit is for example programmed for stabilizing the contact force measured by the force sensor at a predetermined value. The manual version of the invention preferably includes a handle with an elastic coupling that gives the operator a tactile feedback on the contact force.

According to one embodiment of the invention, the control unit is programmed so as to allow the position to be measured according to different measuring modes, characterized by a different method for managing the contact force. Mainly three operating modes can be distinguished, the predefined values mode, the mode between intervals and the instantaneous value mode, or any combination of these modes.

The predefined values mode enables measurements with force values that are fixed or set by the operator. The position is measured when the force is reached and stabilized.

The mode between intervals allows a quick measurement without seeking an exceedingly precise measurement of the contact point. This mode is comparable to the preceding one and requires less stabilization time.

The instantaneous value mode allows the operator to perform a quick measurement immediately upon contact with the part. It this achieves a measurement of the force and of the position as soon as the measurement is triggered.

A mixed mode can be achieved for example by combining the trigger threshold between intervals and the instantaneous measurement, which makes it possible to know the force/position pairs whilst remaining within predetermined contact force value intervals.

According to a preferred embodiment of the invention, the control unit is programmed for determining several measurements for a same contact point for different values of contact force, and this will then make it possible to extrapolate a corresponding measurement at a contact force equal to zero. This also allows the type of material to be determined and the elasticity of the measured material to be measured. It is also possible to start from a predetermined elasticity value and to seek the normal to the measured surface by comparing the variations of the elasticity values measured at different contact points with measurements at different contact forces. This allows the dimension of the probe in the contact direction projected onto the measuring axis to be taken into account.

According to a variant embodiment of the invention, the probe fastening system comprises at least a second force sensor for measuring forces that are orthogonal to the instrument's measuring axis. It is thus possible to determine the orientation of the normal axis to the surface measured relative to the measuring axis. This thus makes it possible to maintain the contact force at known values since it is no longer merged with the force measured along the instrument's displacement axis. This system allows the probe's correct dimension observed on the measuring axis to be taken into account whatever the orientation of the surface measured.

According to a variant embodiment of the invention, the measurement program performs a series of successive measurements along each orthogonal axis to then obtain point coordinates in a bidimensional or tridimensional representation.

According to one embodiment of the invention, the measurement program performs measurements relative to known reference points of the part to be measured. The instrument's orientation is chosen so that the points to be measured are located on the instrument's displacement axis, which makes it possible to optimize the control time whilst taking into account the orientation of each measured surface.

REFERENCE NUMBERS USED IN THE FIGURES

25 Solebase
30 Frame
40 Carriage
50 Cable
55 Upper pulley
60 Handle
56 Counterweight
59 Probe
100 Force sensor
120 Elastic elements
150 Measuring console

The invention claimed is:

1. An instrument for measuring dimensions, including:
   a linear guide supporting a position reference defining a measuring axis;
   a mobile carriage capable of moving parallel to said guide;
   a driving device connected to the carriage by a transmission, so as to determine the linear displacement of the mobile carriage;
   a feeler probe attached to said mobile carriage and designed to come into contact with a part to be measured;
   a position transducer, arranged on the carriage so as to supply a measurement of a position of the feeler probe relative to the measuring axis, wherein
   the carriage is connected to the driving device through at least one force sensor capable of measuring the contact force exerted by the feeler probe on the part measured.

2. The instrument of the preceding claim, wherein the force sensor includes piezoresistive elements or strain gauges.

3. The instrument of claim 1, wherein the force sensor is assembled in an assembly device comprising one or several elastic elements.

4. The instrument of claim 1, wherein the elastic elements increase elastic displacement limits of a measuring system.

5. The instrument of claim 1, comprising a motor acting on or comprised in said driving device, and a control unit arranged so as to control the motor according to the measurement of the contact force.

6. The instrument of claim 5, wherein the control unit is arranged to stabilize the contact force measured at a predetermined value.

7. The instrument of claim 5, wherein the control unit is programmed so as to enable the position to be measured according to different measuring modes, characterized by different methods for managing the contact force.

8. The instrument of claim 7, characterized in that the force is either a predetermined value or in a predetermined interval or an instantaneous value.

9. The instrument of claim 1, wherein the driving device is adapted to be actuated manually by an operator, comprising a display device capable of indicating to the operator the contact force exerted.

10. The instrument of claim 1, arranged for automatically finding a return point of the feeler probe.

11. The instrument of claim 1, arranged for determining several height measurements of the part through several contact force values and for extrapolating a corresponding measurement for a contact force equal to zero.

12. The instrument of claim 1, characterized in that the force sensor is protected against mechanical overloads by stops and/or elastic elements increasing elastic displacement limits of a measuring system.

13. The instrument of claim 12, characterized in that the force sensor is pre-stressed to achieve a measurement along each direction of the measuring axis.

14. The instrument of claim 1, capable of determining and minimizing the elastic deformation of the part to be measured.

15. The instrument of claim 1, including at least a second force sensor arranged along one of the axes orthogonal to the measuring axis defined by the linear guide for determining the orientation of the contact force.

16. The instrument of claim 1, capable of determining the orientation of a surface of the part to be measured.

17. The instrument of claim 1, enabling the dimensions in any orientations whatsoever of the instrument to be measured.

18. The instrument of claim 1, allowing elements not orthogonal to the measuring axis defined by the linear guide to be measured.

19. The instrument of claim 1, said position transducer having an optical sensor.

20. The instrument of claim 1, consisting of a vertical dimension-measuring height gauge, said guide being a frame connected vertically to a solebase.

21. An instrument for measuring dimensions, including:
a linear guide supporting a position reference defining a measuring axis;
a mobile carriage capable of moving parallel to said guide;
a driving device connected to the carriage by a transmission, so as to determine the linear displacement of the mobile carriage (35);
a feeler attached to said mobile carriage and designed to come into contact with a part to be measured;
a position transducer, arranged on the carriage so as to supply a measurement of the feeler's position relative to the measuring axis; and
a vertical dimension-measuring height gauge, said guide being a frame connected vertically to a solebase, wherein
the carriage is connected to the driving device through at least one force sensor capable of measuring the contact force exerted by the probe on the part measured.

22. An instrument for measuring dimensions, including:
a linear guide supporting a position reference defining a measuring axis;
a mobile carriage capable of moving parallel to said guide;
a driving device connected to the carriage by a transmission, so as to determine the linear displacement of the mobile carriage (35);
a feeler attached to said mobile carriage and designed to come into contact with a part to be measured;
a position transducer, arranged on the carriage so as to supply a measurement of the feeler's position relative to the measuring axis, wherein
the carriage is connected to the driving device through at least one force sensor capable of measuring the contact force exerted by the probe on the part measured, and wherein
said instrument is capable of determining the orientation of the surface of the part to be measured.

* * * * *